US012625036B2

(12) United States Patent
Seto et al.

(10) Patent No.: US 12,625,036 B2
(45) Date of Patent: May 12, 2026

(54) ENVIRONMENTAL TEST APPARATUS WITH BYPASS FLOW PATH WITH FLOW RATE CONTROL PORTION CONTROLLED ACCORDING TO TEMPERATURE OF COMPRESSOR

(71) Applicant: ESPEC CORP., Osaka (JP)

(72) Inventors: Haruki Seto, Osaka (JP); Yuta Moriyama, Osaka (JP); Katsuhiko Watabe, Osaka (JP); Tetsuya Okadome, Osaka (JP); Masaki Yamamoto, Osaka (JP); Takumi Usui, Osaka (JP)

(73) Assignee: ESPEC CORP., Osaka (JP)

( * ) Notice: Subject to any disclaimer, the term of this patent is extended or adjusted under 35 U.S.C. 154(b) by 310 days.

(21) Appl. No.: 18/339,572

(22) Filed: Jun. 22, 2023

(65) Prior Publication Data

US 2023/0417632 A1        Dec. 28, 2023

(30) Foreign Application Priority Data

Jun. 28, 2022    (JP) ................................. 2022-103245

(51) Int. Cl.
*G01M 99/00*        (2011.01)
*F25B 7/00*        (2006.01)

(52) U.S. Cl.
CPC ............. *G01M 99/002* (2013.01); *F25B 7/00* (2013.01); *F25B 2400/0409* (2013.01); *F25B 2400/0411* (2013.01)

(58) Field of Classification Search
CPC .......... G01N 2035/00455; G01N 2035/00445; G01N 2035/00346; F25B 25/005; F25B 15/006; G01M 99/002
See application file for complete search history.

(56) References Cited

U.S. PATENT DOCUMENTS 4,208,885  A  *   6/1980   Schmerzler ............... F25B 1/10
                                                              62/403
5,211,713  A  *   5/1993   Suyama ................... F25B 41/24
                                                              62/505

(Continued)

FOREIGN PATENT DOCUMENTS

DE              818648 C       10/1951
EP          0 344 397 B1       3/1993

(Continued)

*Primary Examiner* — Tran M. Tran
(74) *Attorney, Agent, or Firm* — Sughrue Mion, PLLC

(57)        ABSTRACT

There is provided an environmental test apparatus that can create a predetermined environment inside a test chamber, the environmental test apparatus including: the test chamber for placing a test target object; a heating portion; and a cooling portion. The cooling portion has a refrigeration circuit having a compressor, a condenser, an expansion portion, and an evaporator and in which a phase-changing refrigerant is to be circulated. The refrigeration circuit has a first bypass flow path connecting a discharge side of the condenser and a suction side of the compressor and the first bypass flow path is provided with a first flow rate control portion. A temperature measurement portion for measuring a temperature of the compressor and a controller are provided. The controller is configured to control a substantial degree of opening of the first flow rate control portion according to a detection value of the temperature measurement portion.

5 Claims, 4 Drawing Sheets

(56) References Cited

U.S. PATENT DOCUMENTS

| | | | | |
|---|---|---|---|---|
| 6,882,949 | B2 * | 4/2005 | Butts | G01M 99/002 |
| | | | | 702/113 |
| 8,166,773 | B2 * | 5/2012 | Immink | F25B 7/00 |
| | | | | 62/324.1 |
| 8,342,046 | B2 * | 1/2013 | Murakami | G01N 25/68 |
| | | | | 73/865.6 |
| 8,359,906 | B2 * | 1/2013 | Shimada | G01N 17/002 |
| | | | | 73/73 |
| 8,973,383 | B2 * | 3/2015 | Sakami | F24F 3/14 |
| | | | | 62/93 |
| 10,620,113 | B2 * | 4/2020 | Yoshida | G01M 99/002 |
| 10,684,616 | B2 * | 6/2020 | Preston | G01M 99/008 |
| 11,162,714 | B2 | 11/2021 | Haack et al. | |
| 11,237,097 | B2 * | 2/2022 | Blaufelder | B01L 7/50 |
| 11,543,327 | B2 * | 1/2023 | Chen | G01M 99/002 |
| 11,624,538 | B2 * | 4/2023 | Parrabbi | F25B 41/24 |
| | | | | 62/117 |
| 11,754,281 | B2 * | 9/2023 | Tian | F22B 35/08 |
| | | | | 122/4 A |
| 12,007,153 | B2 * | 6/2024 | Ochiai | F24F 11/38 |
| 12,117,374 | B2 * | 10/2024 | Brodsky | G01N 17/002 |
| 12,184,831 | B2 * | 12/2024 | Muhassin | G01M 11/083 |
| 12,372,437 | B1 * | 7/2025 | Jin | G01M 99/008 |
| 2003/0066639 | A1 * | 4/2003 | Wang | F25D 3/10 |
| | | | | 165/263 |
| 2007/0245768 | A1 | 10/2007 | Sakae et al. | |
| 2014/0107965 | A1 * | 4/2014 | Mishra | G01N 33/02 |
| | | | | 702/136 |
| 2017/0167761 | A1 | 6/2017 | Ikeda et al. | |
| 2022/0128325 | A1 | 4/2022 | Pedersen | |
| 2023/0324084 | A1 * | 10/2023 | Maynard | F25B 5/02 |
| | | | | 62/175 |
| 2024/0384908 | A1 * | 11/2024 | Okadome | F25B 49/02 |
| 2025/0192249 | A1 * | 6/2025 | Chiba | G01M 99/002 |

FOREIGN PATENT DOCUMENTS

| | | | |
|---|---|---|---|
| EP | 3 818 321 A0 | 5/2021 | |
| JP | 2007-93017 A | 4/2007 | |
| JP | 2014-66593 A | 4/2014 | |
| JP | WO2015/125743 A1 | 3/2017 | |
| JP | 2019-82493 A | 5/2019 | |
| JP | WO2020/049844 A1 | 9/2020 | |
| KR | 10-2006-0115821 A | 11/2006 | |
| WO | 2020/008281 A1 | 1/2020 | |

* cited by examiner

ENVIRONMENTAL TEST APPARATUS WITH BYPASS FLOW PATH WITH FLOW RATE CONTROL PORTION CONTROLLED ACCORDING TO TEMPERATURE OF COMPRESSOR

CROSS-REFERENCE TO RELATED APPLICATIONS

This application is based on Japanese Patent Application No. 2022-103245 filed on Jun. 28, 2022, the contents of which are incorporated herein by way of reference.

TECHNICAL FIELD

The present invention relates to an environmental test apparatus that can create a specific environment within a test chamber and expose a test target object to a desired environment.

BACKGROUND

An environmental test is known as a test for examining performance and durability of products, parts, and the like. The environmental test is carried out using a facility called an environmental test apparatus. The environmental test apparatus generally has a test chamber and an air conditioning portion. The air conditioning portion includes air conditioning equipment such as a blower, a heating device, and a cooling device. The test chamber and the air conditioning portion, for example, form a series of circulation air paths, and air in the test chamber is introduced into the air conditioning portion, and then a temperature and a humidity of the air are adjusted and the adjusted air is returned into the test chamber, thereby creating a desired temperature environment and humidity environment in the test chamber.

Patent Literature 1: JP2014-66593A

The environmental test apparatus may be operated continuously for long periods of time. Also, during continuous operation, the cooling device of the environmental test apparatus may temporarily be operated under severe conditions.

Therefore, in the environmental test apparatus of the related art, a motor that drives a compressor may generate heat during operation, and thus there is a concern about motor winding burnout, oil viscosity reduction and premature deterioration, and damage to compression parts due to these factors, which are factors that reduce reliability of the environmental test apparatus.

The present invention solves the above-described problems of the related art, and an object of the present invention is to provide an environmental test apparatus that can suppress excessive heat generation of a motor of a compressor.

SUMMARY

An aspect of the present invention is an environmental test apparatus that can create a predetermined environment inside a test chamber, the environmental test apparatus including the test chamber for placing a test target object, a heating portion, and a cooling portion, in which the cooling portion has a refrigeration circuit having a compressor, a condenser, an expansion portion, and an evaporator and in which a phase-changing refrigerant is to be circulated, the refrigeration circuit has a first bypass flow path connecting a discharge side of the condenser and a suction side of the compressor and the first bypass flow path is provided with a first flow rate control portion, a temperature measurement portion for measuring a temperature of the compressor and a controller are provided, and the controller is configured to control an inside of the test chamber to the predetermined environment and is configured to control a substantial degree of opening of the first flow rate control portion according to a detection value of the temperature measurement portion.

In the aspect described above, it is preferable that the compressor be an enclosed compressor in which the motor and a compression portion are built in a closed container, the closed container be configured to contain a lubricating oil, and the temperature measurement portion be attached on an outer surface of the closed container at a position corresponding to an area where the lubricating oil is contained.

In the aspect described above, it is preferable that the compressor be an enclosed compressor in which the motor and a compression portion are built in a closed container, the closed container be configured to contain the lubricating oil, and the compressor have a refrigerant suction port into which the refrigerant is to be introduced, and the temperature measurement portion be attached on an outer surface of the closed container in an area on a side opposite to the refrigerant suction port with respect to an imaginary plane containing a center of the closed container that is parallel to an imaginary plane containing a vertical cross section of the refrigerant suction port.

In the aspect described above, it is preferable that a refrigeration circuit have a second bypass flow path connecting the discharge side of the condenser and the suction side of the compressor, and the second bypass flow path be provided with a second flow rate control portion of which a substantial degree of opening is to change according to a temperature of a refrigerant introduced into the compressor.

In the aspect described above, the refrigeration circuit may have a cascade cooling structure including a primary refrigeration circuit and a secondary refrigeration circuit, and in the primary refrigeration circuit, a high temperature side compressor, a high temperature side condenser, a high temperature side expansion portion, and a primary side of a cascade condenser may be sequentially connected in a ring, in which the phase-changing refrigerant may be circulated. In the secondary refrigeration circuit, a low temperature side compressor, a secondary side of the cascade condenser, a low temperature side expansion portion, and a low temperature side evaporator may be sequentially connected in a ring, in which the phase-changing refrigerant may be circulated.

DESCRIPTION OF EMBODIMENTS

An embodiment of the present invention will be described below.

Figure 1:
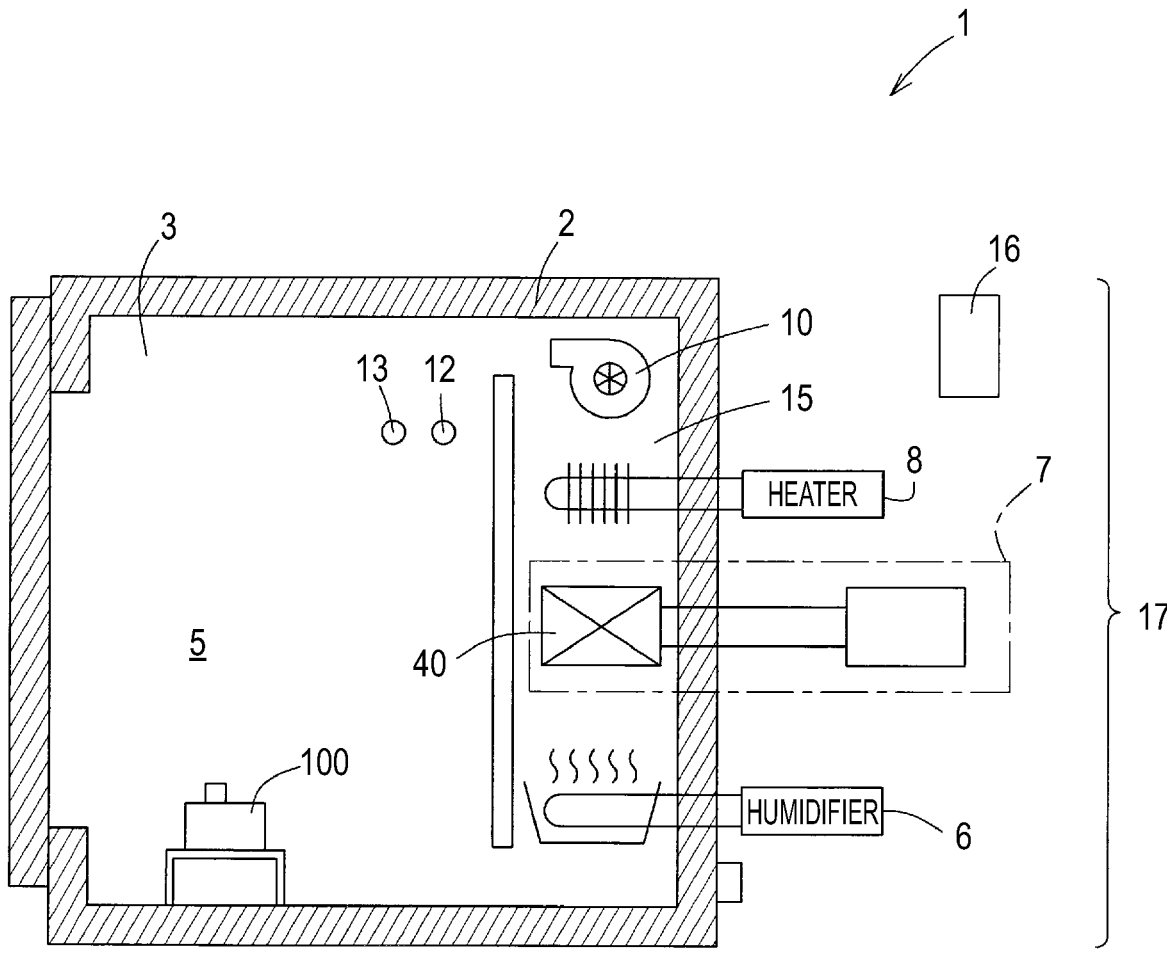
FIG. 1 is a cross-sectional view of an environmental test apparatus according to an embodiment of the present invention.

An environmental test apparatus 1 according to the present embodiment includes a heat insulating chamber 3 covered with a heat insulating wall 2 as illustrated in FIG. 1. A test chamber 5 is formed in a part of the heat insulating chamber 3. The test chamber 5 is a space in which a test target object 100 is installed. The environmental test apparatus 1 further includes a humidifier 6, a cooling device (cooling portion) 7, a heater (heating portion) 8, and a blower 10. The environmental test apparatus 1 has an air flow path 15 communicating with the test chamber 5, and the air flow path 15 is provided with the humidifier 6, the cooling device 7, the heater 8, and the blower 10.

Further, a temperature sensor (chamber internal temperature detection unit) 12 and a humidity sensor 13 are provided on an outlet side of the air flow path 15. In the environmental test apparatus 1, an air conditioner 17 is configured by the members in the air flow path 15, the temperature sensor 12, and the humidity sensor 13. The air conditioner 17 is controlled by a control device (controller) 16.

The environmental test apparatus 1 can create a desired temperature/humidity environment in the test chamber 5 by the air conditioner 17 controlled by the control device 16. That is, the control device 16 controls an inside of the test chamber 5 to a predetermined environment. The control device (controller) 16 is configured by, for example, a processor.

Figure 2:
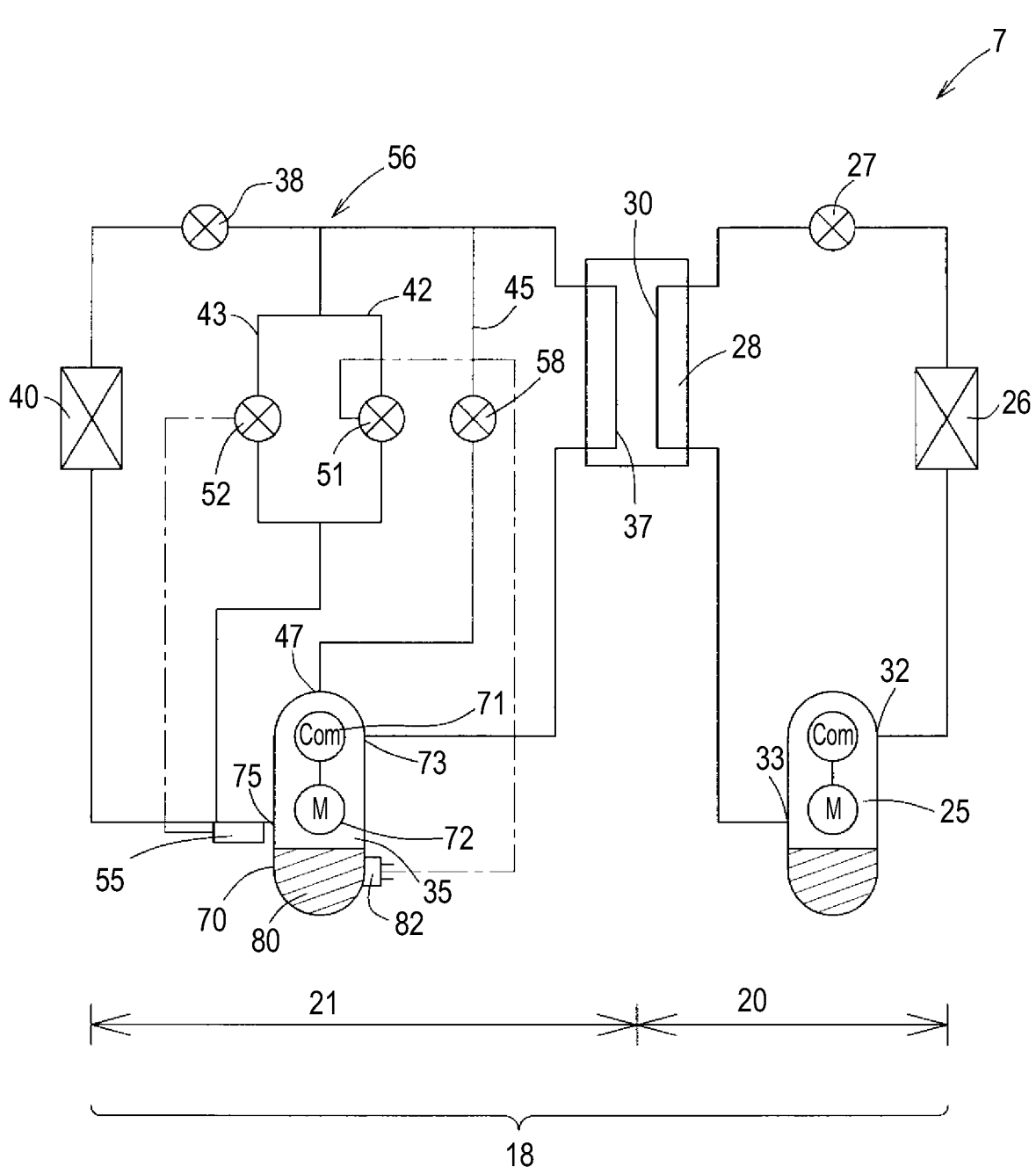
FIG. 2 is an operating principle diagram of a cooling device mounted on the environmental test apparatus of FIG. 1.

The cooling device 7 adopted in the environmental test apparatus 1 according to the present embodiment includes a refrigeration circuit 18 as illustrated in FIG. 2. The refrigeration circuit 18 of the cooling device (cooling portion) 7 will be described below.

The cooling device 7 has a cascade cooling structure including a primary refrigeration circuit 20 and a secondary refrigeration circuit 21. The primary refrigeration circuit 20 is configured such that a refrigerant discharge port 32 of a high temperature side compressor 25, a high temperature side condenser 26, a high temperature side expansion portion 27, a primary flow path 30 of a cascade condenser 28, and a refrigerant suction port 33 of the high temperature side compressor 25 are sequentially connected in a ring. A phase-changing high temperature side refrigerant is enclosed in the primary refrigeration circuit 20 described above. The primary refrigeration circuit 20 implements a refrigerating cycle similar to a known one. The high temperature side expansion portion 27 is an expansion valve of which a degree of opening can be adjusted by an actuator such as a motor.

The secondary refrigeration circuit 21 is configured such that a refrigerant discharge port 73 of a low temperature side compressor 35, a secondary flow path 37 of the cascade condenser 28, a low temperature side expansion portion 38, a low temperature side evaporator (cooler) 40, and a refrigerant suction port 75 of the low temperature side compressor 35 are sequentially connected in a ring. The cascade condenser 28 functions as a condenser for the secondary refrigeration circuit 21.

The low temperature side evaporator (cooler) 40 is installed in the air flow path 15 as illustrated in FIG. 1. The low temperature side expansion portion 38 is an expansion valve of which a degree of opening can be adjusted by an actuator such as a motor.

A phase-changing low-temperature side refrigerant is enclosed in the secondary side refrigeration circuit 21 described above. The refrigerant enclosed in the secondary refrigeration circuit 21 can create a low temperature of −70° C., for example.

The secondary side refrigeration circuit 21 implements a refrigerating cycle similar to a known one. Then, the refrigerant in the primary refrigeration circuit 20 is evaporated in the primary flow path 30 of the cascade condenser 28 of the primary refrigeration circuit 20 to lower a temperature of the cascade condenser 28 in the same manner as in a known cascade cooling structure. The low temperature generated at this time condenses the refrigerant passing through the cascade condenser (condenser) 28 of the secondary refrigeration circuit 21.

The secondary refrigeration circuit 21 also has three rows of bypass flow paths 42, 43, and 45.

The first bypass flow path 42 is a flow path branched from a portion between the cascade condenser (condenser) 28 and the low temperature side expansion portion 38 and connected to a portion between the low temperature side evaporator 40 and the refrigerant suction port 75 of the low temperature side compressor 35. That is, the first bypass flow path 42 is a flow path that connects a discharge side of the cascade condenser (condenser) 28 and a suction side of the low temperature side compressor 35.

A first bypass expansion portion 51 is provided in the first bypass flow path 42. The first bypass expansion portion 51 is a control valve that has an actuator such as a motor and can freely change a degree of opening according to an electric signal. It is desirable that the first bypass expansion portion 51 can be fully closed.

In the present embodiment, a temperature detection unit 82 is attached to the low temperature side compressor 35, and the control device 16 adjusts the degree of opening of the first bypass expansion portion 51 according to a temperature detected by the temperature detection unit 82. Specifically, the control device 16 increases the degree of opening of the first bypass expansion portion 51 when the temperature detected by the temperature detection unit 82 increases, and decreases the degree of opening of the first bypass expansion portion 51 when the temperature detected by the temperature detection unit 82 decreases.

For example, the first bypass expansion portion 51 is normally fully closed, and is opened when a temperature detected by the temperature detection unit 82 exceeds a certain threshold. As the detected temperature rises, a degree of opening of the first bypass expansion portion 51 increases.

Similar to the first bypass flow path 42, the second bypass flow path 43 is also a flow path branched from a portion between the cascade condenser (condenser) 28 and the low temperature side expansion portion 38 and connected to a portion between the low temperature side evaporator 40 and the refrigerant suction port 75 of the low temperature side compressor 35. That is, the second bypass flow path 43 is a flow path that connects the discharge side of the cascade condenser (condenser) 28 and the suction side of the low temperature side compressor 35.

A second bypass expansion portion 52 is provided in the second bypass flow path 43.

The second bypass expansion portion 52 is a so-called thermal expansion valve. The thermal expansion valve is also called a thermal automatic expansion valve or a heat sensing expansion valve, and includes a temperature sensing cylinder 55. The thermal expansion valve has a plunger inside, and a degree of opening of an orifice changes according to a temperature of the temperature sensing cylinder 55 and a temperature near an outlet of the second bypass expansion portion 52. That is, a charge medium is enclosed in the temperature sensing cylinder 55, and the charge medium expands and contracts according to the temperature of the temperature sensing cylinder 55. A pressure of the temperature sensing cylinder 55 is applied to the plunger via a flange or the like, and as a result, a force is applied to the plunger in the thermal expansion valve according to a detected temperature of the temperature sensing cylinder 55. Further, since a refrigerant pressure on an outlet side of the orifice is also applied to the plunger via the flange or the like, a force is applied to the plunger according to a refrigerant temperature on the outlet side of the orifice. Since the orifice stops when both are balanced, the second bypass expansion portion 52 is consequently controlled based on a temperature around the temperature sensing cylinder 55 and a temperature near the second bypass expansion portion 52. The second bypass expansion portion 52 changes the degree of opening thereof so that a difference between the temperature of the temperature sensing cylinder 55 and the temperature near the outlet of the second bypass expansion portion 52 becomes a predetermined temperature.

It is desirable that the second bypass expansion portion 52 can also be fully closed. For example, the second bypass expansion portion 52 is normally fully closed and opens when the detected temperature of the temperature sensing cylinder 55 exceeds a certain threshold. As the detected temperature rises, the degree of opening thereof increases.

In the present embodiment, as illustrated in FIG. 2, the temperature sensing cylinder 55 is arranged near the refrigerant suction port 75 of the low temperature side compressor 35, and the temperature sensing cylinder 55 senses a temperature of the refrigerant introduced into the low temperature side compressor 35. Therefore, a degree of opening of the second bypass expansion portion 52 is adjusted according to the temperature of the refrigerant introduced into the low temperature side compressor 35.

Specifically, when the temperature of the refrigerant introduced into the low temperature side compressor 35 rises, the degree of opening of the second bypass expansion portion 52 increases, and when the detected temperature decreases, the degree of opening thereof decreases.

In the present embodiment, there is a branching portion 56 between the cascade condenser 28 and the low temperature side expansion portion 38, and the branching portion 56 is further divided into the first bypass flow path 42 and the second bypass flow path 43.

A flow path where the first bypass flow path 42 and the second bypass flow path 43 join is connected to a flow path leading between the low temperature side evaporator 40 and the refrigerant suction port 75 of the low temperature side compressor 35.

A flow path configuration of a bypass flow path is not limited to the configuration illustrated in FIG. 2. There may be a plurality of branching portions between the cascade condenser 28 and the low temperature side expansion portion 38, and one of the branching portions may be a starting point of the first bypass flow path 42 and another branching portion may be a starting point of the second bypass flow path 43.

The same applies to terminal sides of the first bypass flow path 42 and the second bypass flow path 43. Thus, there may be a plurality of confluence portions between the low temperature side evaporator 40 and the refrigerant suction port 75 of the low temperature side compressor 35, and the first bypass flow path 42 may be connected to one confluence portion and the second bypass flow path 43 may be connected to another confluence portion.

Since a refrigerant flowing through the first bypass flow path 42 and the second bypass flow path 43 is in a liquid phase or a gas-liquid mixed state, the refrigerant has a sufficient cooling capacity. Therefore, the first bypass flow path 42 and the second bypass flow path 43 can function as a refrigerant cooling portion for lowering a temperature of the low temperature side compressor 35.

The third bypass flow path 45 is a flow path that branches from a portion between the cascade condenser 28 and the low temperature side expansion portion 38 and that reaches an intermediate cooling port 47 of the low temperature side compressor 35. A third bypass expansion portion 58 is provided in the third bypass flow path 45. The third bypass expansion portion 58 is a control valve that has an actuator such as a motor and can freely change the degree of opening according to an electric signal. It is desirable that the third bypass expansion portion 58 can be fully closed.

The third bypass expansion portion 58 is not limited to a configuration having a function of adjusting the degree of opening, and may be a configuration that does not have the function of adjusting the degree of opening of the valve itself such as a combination of a capillary tube and a solenoid valve. In this case, a refrigerant flow rate is adjusted by controlling an opening and closing interval of the solenoid valve. As a result, the degree of opening of the third bypass expansion portion 58 is substantially adjusted.

The refrigerant flowing through the third bypass flow path 45 is also in a liquid phase or a gas-liquid mixture state and has a sufficient cooling capacity.

The low temperature side compressor 35 adopted in the present embodiment is an enclosed compressor, and has a compression mechanism (compression portion) 71, a motor 72, and an oil pump (not illustrated) built in a closed container 70 of the low temperature side compressor 35.

Electric power is supplied to the motor 72 in the closed container 70 from an electric power supply portion (not illustrated), and the motor 72 rotates in the closed container 70. The compression mechanism 71 is connected to a rotating shaft of the motor 72, and rotation of the motor 72 drives the compression mechanism 71 in the closed container 70.

A type of the compression mechanism 71 is not limited, and may be, for example, a reciprocating type, a rotary type, a scroll type, or the like.

Similar to the low temperature side compressor 35, the high temperature side compressor 25 has a compression mechanism (compression portion), a motor, and an oil pump (not illustrated) built in a closed container of the high temperature side compressor 25.

The refrigerant suction port 75, the refrigerant discharge port 73, and the intermediate cooling port 47 are opened in the closed container 70.

The refrigerant suction port 75 is a conduit that communicates an inside and an outside of the closed container 70. The refrigerant discharge port 73 is a conduit connecting a discharge portion of the compression mechanism 71 and the outside.

The intermediate cooling port 47 is a conduit that communicates the inside and the outside of the closed container 70 and opens near a contour portion of the compression mechanism 71.

A refrigerant is introduced into the closed container 70 from the refrigerant suction port 75. The refrigerant diffuses in the closed container 70. By driving the motor 72, the compression mechanism 71 is driven, sucks and compresses the refrigerant in the closed container 70, and discharges the refrigerant from the refrigerant discharge port 73.

Also, the refrigerant introduced from the third bypass flow path 45 is injected from the intermediate cooling port 47 to the compression mechanism 71 to cool the compression mechanism 71.

Figure 3:
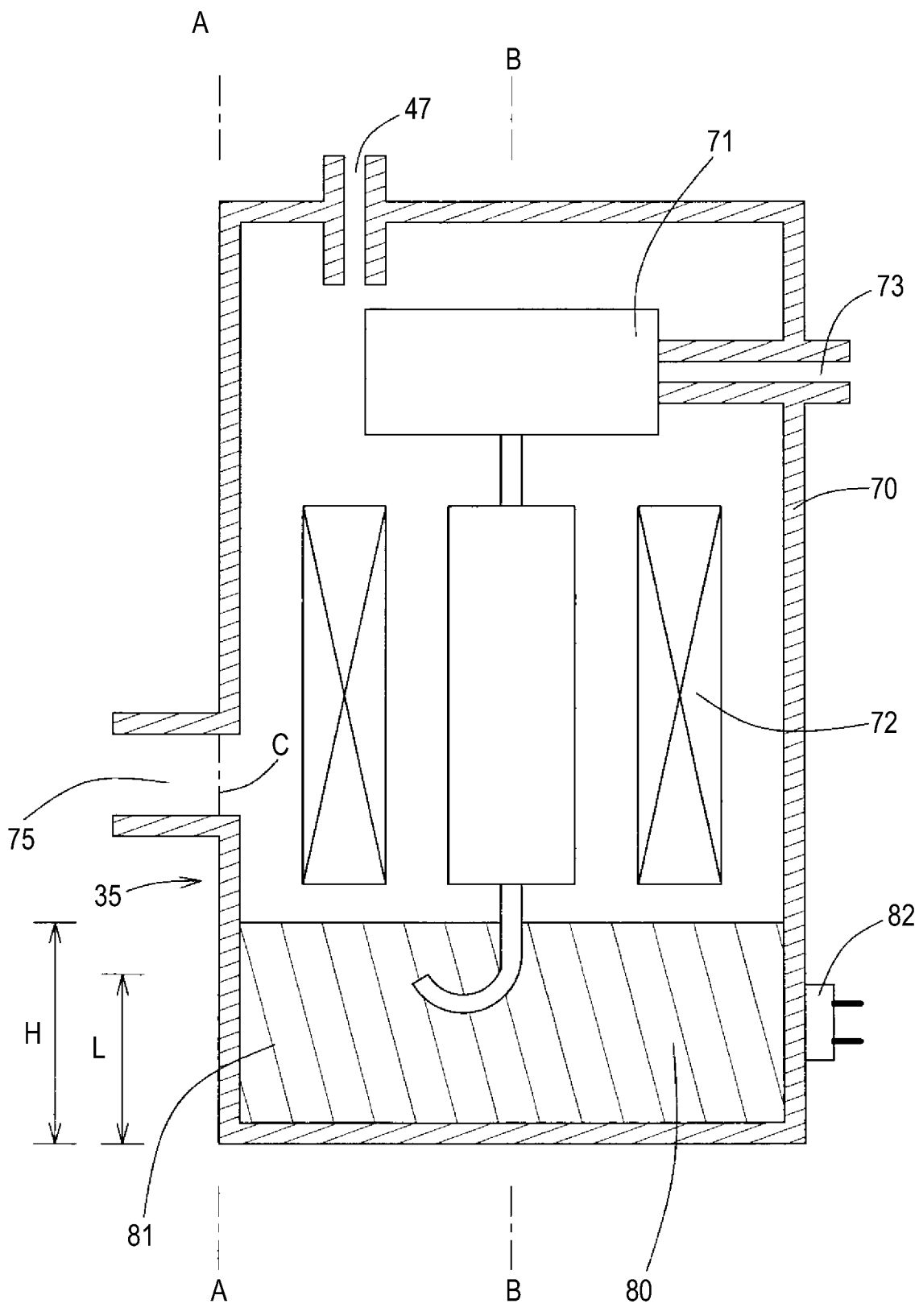
FIG. 3 is a conceptual diagram of an enclosed compressor used in a low temperature side refrigeration circuit of the cooling device of FIG. 2.

An oil tank portion 81 is provided in the closed container 70 as illustrated in FIG. 3, and a lubricating oil 80 is stored in the oil tank portion 81. There is an oil pump (not illustrated) in the closed container 70. When the motor 72 is rotated, the oil pump rotates to suck the lubricating oil 80 from the oil tank portion 81 and supply the lubricating oil 80 to each part in the closed container 70. The lubricating oil 80 supplied to each part returns to the oil tank portion 81. That is, the lubricating oil 80 circulates in the closed container 70.

The low temperature side compressor 35 adopted in the present embodiment has the temperature detection unit 82 attached to an outer surface of the closed container 70.

The temperature detection unit 82 is, for example, a thermistor or a thermocouple.

An attachment position of the temperature detection unit 82 is equal to or lower than a height corresponding to the oil tank portion 81 in a height direction.

That is, the attachment position of the temperature detection unit 82 is equal to or lower than the height of the lubricating oil 80 stored in the closed container 70.

Although a liquid level of the lubricating oil 80 changes by driving the oil pump, it is desirable that the attachment position of the temperature detection unit 82 is at least at a position where at least a part of a temperature detection portion of the temperature detection unit 82 is equal to or lower than a height (hereinafter referred to as a maximum height H) of an oil level when the oil pump is stopped and most of the lubricating oil 80 is stored below. A more desirable height is the height in which the entirety of the temperature detection portion of the temperature detection unit 82 is equal to or lower than the maximum height H.

Also, although the oil level lowers when the oil pump is driven, it is desirable that at least a part of the temperature detection portion of the temperature detection unit 82 is placed at a height equal to or lower than a height (hereinafter referred to as a minimum height L) of the oil level when the oil pump is driven. A more desirable height is the height in which the entirety of the temperature detection portion of the temperature detection unit 82 is equal to or lower than the minimum height L.

Moreover, the attachment position of the temperature detection unit 82 is desirably in an area opposite to the refrigerant suction port 75 in a circumferential direction.

Figure 4:
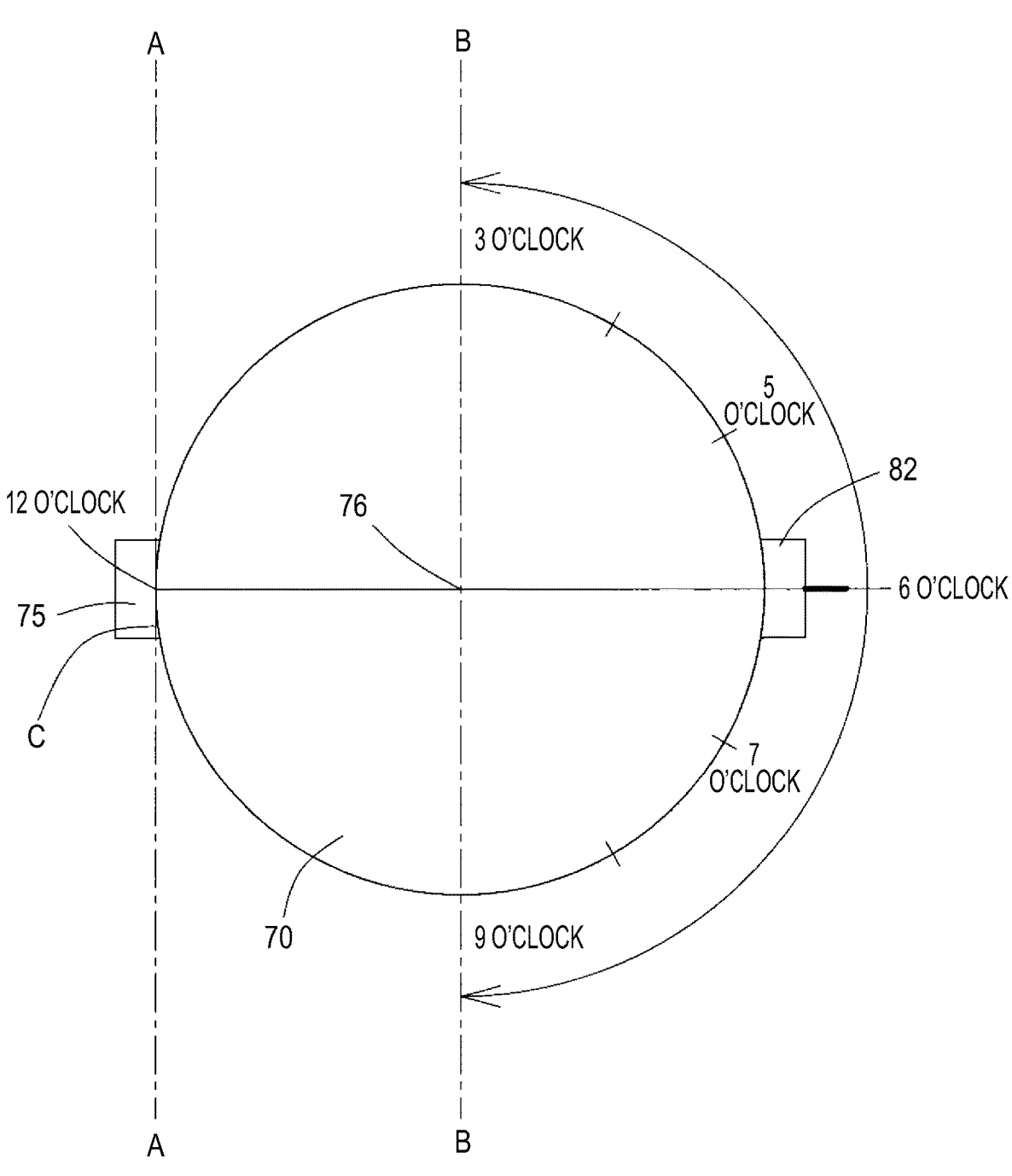
FIG. 4 is a plan view of the enclosed compressor of FIG. 3.

That is, as illustrated in FIGS. 3 and 4, assuming an imaginary plane A that includes a vertical plane C of the refrigerant suction port 75, the attachment position of the temperature detection unit 82 in the circumferential direction is desirably in an area on a side opposite to the refrigerant suction port 75 with respect to an imaginary plane B that is parallel to the imaginary plane A and contains a center 76 of the closed container 70. The imaginary plane A is a plane that becomes a vertical plane when the low temperature side compressor 35 is installed on a horizontal floor surface, and includes the vertical plane C of the refrigerant suction port 75. The imaginary plane B is a plane that becomes a vertical plane when the low temperature side compressor 35 is installed on a horizontal floor surface, is parallel to the vertical plane C of the refrigerant suction port 75, and passes through the center 76 of the closed container 70.

The attachment position of the temperature detection unit 82 in the circumferential direction is desirably in an area on the side opposite to the refrigerant suction port 75 with respect to the imaginary plane B.

In other words, when a position of the refrigerant suction port 75 is assumed to be 12 o'clock of the clock, it is desirable that the attachment position of the temperature detection unit 82 is in an area from 3 o'clock to 9 o'clock. When converted to an angle, the area ranges from 90 degrees to 270 degrees with the position of the refrigerant suction port 75 as an origin.

A more recommended range is a position between 5 o'clock to 7 o'clock. When converted to an angle, the position ranges from 150 degrees to 210 degrees with the position of the refrigerant suction port 75 as an origin.

When the low temperature side compressor 35 is driven, the lubricating oil 80 circulates in the closed container 70 as described above. Since the lubricating oil 80 also flows into the motor 72, a temperature of the lubricating oil 80 and a temperature of the motor 72 are highly correlated with each other. Therefore, the temperature of the lubricating oil 80 reflects the temperature of the motor 72.

In the present embodiment, the temperature detection unit 82 is installed on the outer surface of the closed container 70 at a position equal to or lower than the height of the stored lubricating oil 80, so that the temperature detection unit 82 will detect the temperature of the lubricating oil 80 in the closed container 70. Since the temperature of the lubricating oil 80 reflects the temperature of the motor 72, the temperature detected by the temperature detection unit 82 has a high correlation with the temperature of the motor 72.

In the present embodiment, the attachment position of the temperature detection unit 82 in the circumferential direction is an area on the side opposite to the refrigerant suction port 75. Therefore, the temperature detected by the temperature detection unit 82 is less likely to be affected by the refrigerant introduced into the closed container 70.

That is, the temperature of the refrigerant introduced into the closed container 70 is generally low. Therefore, when the temperature detection unit 82 is located near the refrigerant suction port 75, the temperature detection unit 82 may detect a low temperature due to the influence of the introduced refrigerant, and thus the correlation with the temperature of the motor 72 decreases.

In the present embodiment, since the attachment position of the temperature detection unit 82 is away from the refrigerant suction port 75, the temperature detection unit 82 is less likely to be affected by the refrigerant, and a temperature highly correlated with the temperature of the motor 72 can be detected.

Next, functions of the cooling device 7 will be described.

The cooling device 7 activates and drives the high temperature side compressor 25 of the primary refrigeration circuit 20 and the low temperature side compressor 35 of the secondary refrigeration circuit 21.

In the primary refrigeration circuit 20, the high temperature side compressor 25 compresses the refrigerant, and the high temperature side condenser 26 cools and condenses the refrigerant. Then, the liquefied refrigerant passes through a narrow gap of the high temperature side expansion portion 27 and enters the primary flow path 30 of the cascade condenser 28 to vaporize and lower the temperature of the cascade condenser 28. The refrigerant discharged from the primary flow path 30 of the cascade condenser 28 returns to the high temperature side compressor 25 and is compressed again.

In the secondary refrigeration circuit 21, the low temperature side compressor 35 compresses the refrigerant, and the refrigerant is cooled and condensed in the secondary flow path 37 of the cascade condenser (condenser) 28. Then, the liquefied refrigerant passes through a narrow gap of the low temperature side expansion portion 38 and enters the low temperature side evaporator (cooler) 40 to vaporize and lower the temperature of the low temperature side evaporator (cooler) 40. The refrigerant discharged from the low temperature side evaporator (cooler) 40 returns to the low temperature side compressor 35 and is compressed again.

The cooling device 7 is controlled by the control device 16 and operated so that a temperature inside the test chamber 5 is maintained at a set temperature. In the present embodiment, the low temperature side expansion portion 38 is controlled by the control device 16 so that the temperature inside the test chamber 5 approaches the set temperature. That is, the low temperature side expansion portion 38 is controlled so that the degree of opening increases when the difference between the temperature inside the test chamber 5 and the set temperature is large, and the degree of opening decreases when the temperature inside the test chamber 5 approaches the set temperature and a cooling load decreases.

In the present embodiment, when a temperature inside the low temperature side compressor 35 becomes excessively high or when there is concern that the temperature may become excessively high, a refrigerant having a cooling capacity is supplied to the low temperature side compressor 35 from the first bypass flow path 42 and the second bypass flow path 43. Therefore, overload operation of the motor 72, burning of a coil, decrease in viscosity of the lubricating oil, and deterioration of the lubricating oil are suppressed.

The temperature inside the low temperature side compressor 35 can become excessively high for the following two reasons.

(1) In Case of Overload Operation

The environmental test apparatus 1 can create a high temperature environment and a low temperature environment in the test chamber 5.

For example, when the temperature inside the test chamber 5 is high, the control device 16 activates the cooling device 7 upon receiving an instruction to change the set temperature to a lower temperature. When the temperature inside the test chamber 5 is lowered at once, the temperature inside the low temperature side compressor 35 may become excessively high. That is, since the temperature inside the test chamber 5 is high, the liquefied refrigerant introduced into the low temperature side evaporator (cooler) 40 immediately vaporizes, and with the gas temperature of the refrigerant rising due to the heat of the test chamber 5, the refrigerant returns to the low temperature side compressor 35. Therefore, the temperature inside the low temperature side compressor 35 may become excessively high.

(2) When Cooling Load is Small

When the temperature inside the test chamber 5 stabilizes at a low temperature state and the cooling load becomes small, a signal from the control device 16 throttles the degree of opening of the low temperature side expansion portion 38 to reduce an amount of the refrigerant supplied to the low temperature side evaporator (cooler) 40.

As a result, the amount of cold heat for cooling the low temperature side compressor 35 is reduced. On the other hand, since the motor 72 continues to rotate, the heat generated by the motor 72 is accumulated in the closed container 70 and the temperature inside the low temperature side compressor 35 rises.

Here, a low temperature state includes, for example, a range of −70° C. to −40° C., −40° C. to −20° C., or −20° C. to +30° C.

Next, functions of the first bypass flow path 42 and the second bypass flow path 43 will be described.

(1) In Case of Overload Operation

As described above, under the overload operation state, the refrigerant returns to the low temperature side compressor 35 at a high temperature state.

In the cooling device 7 of the present embodiment, the temperature sensing cylinder 55 of the second bypass expansion portion 52 is arranged near the refrigerant suction port 75 of the low temperature side compressor 35, and the temperature sensing cylinder 55 senses the temperature of the refrigerant introduced into the low temperature side compressor 35. When the temperature of the refrigerant returning to the low temperature side compressor 35 increases, the temperature is detected by the temperature sensing cylinder 55 and the degree of opening of the second bypass expansion portion 52 increases. As a result, the degree of opening of the second bypass expansion portion 52 increases, and the refrigerant having a cooling capacity flows through the second bypass flow path 43, and then the refrigerant is introduced into the closed container 70 to suppress the temperature rise of the low temperature side compressor 35.

At a stage where the degree of opening of the second bypass expansion portion 52 increases, there is no supply of the refrigerant from the first bypass flow path 42 to the low temperature side compressor 35, or even if there is supply of the refrigerant, the supply of the refrigerant is small.

(2) When Cooling Load is Small

As described above, when the temperature inside the test chamber 5 stabilizes at the low temperature state and the cooling load is small, the degree of opening of the low temperature side expansion portion 38 becomes small. As a result, the amount of the refrigerant returning from the low temperature side evaporator (cooler) 40 to the low temperature side compressor 35 is small, but the temperature of the returning refrigerant itself is low. In this case, the temperature detected by the temperature sensing cylinder 55 is low, and the second bypass expansion portion 52 is in a state where the degree of opening is small or remains closed. Therefore, the refrigerant cannot be expected to flow into the closed container 70 from the second bypass flow path 43.

In the environmental test apparatus 1 according to the present embodiment, when the cooling load is small, refrigerant is introduced into the closed container 70 from the first bypass flow path 42 instead of the second bypass flow path 43.

That is, in the present embodiment, the temperature detection unit 82 is attached to the outer surface of the closed container 70 and the temperature detection unit 82 substantially monitors the temperature of the lubricating oil 80 inside the closed container 70. Then, when the temperature detection unit 82 detects a high temperature, the control device 16 increases the degree of opening of the first bypass expansion portion 51. As a result, even when the temperature detected by the temperature sensing cylinder 55 is low and the second bypass flow path 43 does not open, the refrigerant having a cooling capacity flows through the first bypass flow path 42 and is introduced into the closed container 70 to suppress the temperature rise of the low temperature side compressor 35.

In other words, in the environmental test apparatus 1 according to the present embodiment, the control device 16 (controller) controls the degree of opening of the first bypass expansion portion 51 according to the detection value of the temperature detection unit 82 when the inside of the test chamber 5 is in a stable state. Here, an example of the stable state includes a state in which the temperature inside the test chamber 5 reaches the set temperature or a predetermined allowable range of the set temperature. Also, other examples of the stable state include a state in which an output value of the heater 8 or an amount of change thereof calculated by the control device 16 is within a predetermined range, a state in which a cooling output value or the amount of change thereof calculated by the control device 16 is within a predetermined range, and a state in which the degree of opening of the low temperature side expansion portion 38 or the amount of change thereof calculated by the control device 16 is within a predetermined range.

As described above, when the cooling device 7 of the present embodiment is forced to perform an overload operation that causes the temperature inside the test chamber 5 to lower rapidly, the second bypass flow path 43 opens to suppress the temperature rise of the low temperature side compressor 35.

Also, the cooling device 7 of the present embodiment opens the first bypass flow path 42 and suppresses the temperature rise of the low temperature side compressor 35 when the amount of the returning refrigerant is small, such as when the cooling load is small.

In this way, the environmental test apparatus according to the present embodiment suppresses the excessive temperature rise of the low temperature side compressor 35 in any situation of an assumed use state, and thus the overload operation of the motor 72, burning of the coil, decrease in the viscosity of the lubricating oil, and deterioration of the lubricating oil are suppressed.

Further, since the environmental test apparatus 1 according to the present embodiment has the third bypass flow path 45 and the refrigerant is supplied from the third bypass flow path 45 to the intermediate cooling port 47 of the low temperature side compressor 35, the inside of the closed container 70 is also cooled by the refrigerant supplied from the intermediate cooling port 47.

The third bypass expansion portion 58 of the third bypass flow path 45 substantially increases the degree of opening when the load on the motor 72 increases.

The environmental test apparatus 1 illustrated in FIG. 1 is merely an example of the present invention, and the layout and the presence or absence of equipment are not limited.

For example, there may be the air conditioner 17 on a lower side of the test chamber 5. The humidifier 6 and the humidity sensor 13 may be omitted if the purpose is solely to create a temperature environment.

The embodiment described above is an environmental test apparatus mainly used for exposing a test target object to a high temperature environment or a low temperature environment. However, the present invention is not limited to this type of environmental test apparatus, and can also be applied to an environmental test apparatus called a thermal shock test apparatus or a thermal cycle test apparatus.

In the embodiment described above, an electronic control valve that can freely change the degree of opening by an electric signal is adopted as the first flow rate control portion. However, the present invention does not limit the first flow rate control portion to an electronic control valve.

For example, a combination of a throttle member such as a capillary tube and an on-off valve such as a solenoid valve may be used as the first flow rate control portion. In this case, a configuration is conceivable in which an opening and closing time interval of the solenoid valve is controlled to control a substantial degree of opening.

It is also possible to provide a sub-bypass flow path in which a plurality of throttling members such as capillary tubes are connected in parallel, and to provide an on-off valve in each sub-bypass flow path as the first flow rate control portion. In this case, by varying the number of opened on-off valves, the substantial degree of opening of the entirety of the sub-bypass flow path is controlled.

The same can be applied to the second flow rate control portion, and a combination of a throttle member such as a capillary tube and an on-off valve such as a solenoid valve, or a sub-bypass flow path in which a plurality of throttle members such as capillary tubes are connected in parallel may be used as the second flow rate control portion.

In the embodiment described above, the second bypass flow path 43 and the third bypass flow path 45 are provided in addition to the first bypass flow path 42. However, the second bypass flow path 43 and the third bypass flow path 45 are not essential, and either the second bypass flow path 43 or the third bypass flow path 45 may be omitted. Also, both the second bypass flow path 43 and the third bypass flow path 45 may be omitted.

As described above, in the environmental test apparatus 1, the control device 16 (controller) controls the degree of opening of the first bypass expansion portion 51 according to a detection value of the temperature detection unit 82 when the inside of the test chamber 5 is in a stable state.

Here, a configuration may be adopted in which a determination portion for determining whether the inside of the test chamber 5 is in a stable state is provided, and the degree of opening of the first bypass expansion portion 51 is controlled according to the detection value of the temperature detection unit 82 on the condition that the determination portion determines that the state is stable.

Alternatively, the first bypass expansion portion 51 may be operated without providing the determination portion.

It is desirable that the attachment position of the temperature detection unit 82 is equal to or lower than the height position corresponding to the oil tank portion 81 in the height direction and is in the area on a side opposite to the refrigerant suction port 75 with respect to the imaginary plane B in the circumferential direction. However, the present invention does not limit the attachment position of the temperature detection unit 82 to this position, and the temperature detection unit 82 may be located at any position.

The environmental test apparatus 1 described above adopts the cooling device (cooling portion) 7 having a cascade cooling structure. However, the present invention is not limited to this configuration, and may adopt a cooling device (cooling portion) having a single cooling structure.

A typical cooling device having a single cooling structure has one compressor, one condenser, one expansion portion, and one evaporator, in which a phase-changing refrigerant is circulated. The cooling device having the single cooling structure adopting the present invention has a first bypass flow path connecting a discharge side of a condenser and a suction side of a compressor, and the first bypass flow path is provided with a first flow rate control portion. A temperature measurement portion is provided in the one compressor, and a substantial degree of opening of the first flow rate control portion is controlled according to a detection value of the temperature measurement portion.

The cooling device having the single cooling structure adopting the present invention preferably includes a second bypass flow path and a third bypass flow path in addition to the first bypass flow path.

In addition, in the cooling device having the single cooling structure adopting the present invention, a position where the temperature measurement portion is attached to the compressor is preferably the same position as in the case of the low temperature side compressor 35 of the cooling device (cooling portion) 7 having the cascade cooling structure of the present embodiment.

As described above, an aspect of the present invention is an environmental test apparatus that can create a predetermined environment inside a test chamber, the environmental test apparatus including the test chamber for placing a test target object, a heating portion, and a cooling portion, in which the cooling portion has a refrigeration circuit having a compressor, a condenser, an expansion portion, and an evaporator and in which a phase-changing refrigerant is to be circulated, the refrigeration circuit has a first bypass flow path connecting a discharge side of the condenser and a suction side of the compressor and the first bypass flow path is provided with a first flow rate control portion, a temperature measurement portion for measuring a temperature of the compressor and a controller are provided, and the controller is configured to control an inside of the test chamber to the predetermined environment and is configured to control a substantial degree of opening of the first flow rate control portion according to a detection value of the temperature measurement portion.

Here, "control a substantial degree of opening of the first flow rate control portion" is intended to include control to change a time of an open state and a time of a closed state by controlling an opening and closing interval and an opening and closing time of an on-off valve, for example, in addition to control to increase or decrease an actual degree of opening of a valve by an actuator such as a motor.

The refrigeration circuit adopted by the environmental test apparatus of this aspect has the first bypass flow path connecting the discharge side of the condenser and the suction side of the compressor, and the first bypass flow path is provided with the first flow rate control portion. Therefore, when the first flow rate control portion is opened, at least a part of the refrigerant condensed in the condenser is introduced into the compressor via the first bypass flow path. Here, the refrigerant passing through the first bypass flow path is a refrigerant in a liquid phase or gas-liquid mixed state, and maintains a high cooling capacity.

Therefore, when the first flow rate control portion is opened and the refrigerant in the liquid phase or gas-liquid mixed state is introduced into the compressor, the compressor is cooled by a cooling capacity of the refrigerant.

The environmental test apparatus of this aspect has a temperature measurement portion for measuring a temperature of a compressor, and a degree of opening of the first flow rate control portion is controlled according to the detection value of the temperature measurement portion. Specifically, when a temperature of the compressor rises, the first flow rate control portion opens or the degree of opening of the first flow rate control portion is substantially increased, and thus the refrigerant flowing through the first bypass flow path is introduced into the compressor to cool a motor or the like.

In the aspect described above, it is preferable that the compressor be an enclosed compressor in which the motor and a compression portion are built in a closed container, the closed container be configured to contain a lubricating oil, and the temperature measurement portion be attached on an outer surface of the closed container at a position corresponding to an area where the lubricating oil is contained.

In the enclosed compressor, there is a correlation between a temperature of the lubricating oil inside and heat generated by the motor. In the environmental test apparatus of this aspect, a temperature measurement portion is attached on an outer surface of a closed container at a position corresponding to an area where a lubricating oil is contained. Therefore, a temperature and a temperature change of the lubricating oil can be known by the temperature measurement portion, and thus a heat generation status of a motor can be accurately detected.

In the aspect described above, it is preferable that the compressor be an enclosed compressor in which the motor and a compression portion are built in a closed container, the closed container be configured to contain the lubricating oil, and the compressor have a refrigerant suction port into which the refrigerant is to be introduced, and the temperature measurement portion be attached on an outer surface of the closed container in an area on a side opposite to the refrigerant suction port with respect to an imaginary plane containing a center of the closed container that is parallel to an imaginary plane containing a vertical cross section of the refrigerant suction port.

In the environmental test apparatus of this aspect, a temperature measurement portion is attached in an area on a side opposite to a refrigerant suction port with respect to an imaginary plane containing a center of a closed container that is parallel to an imaginary plane containing a vertical cross section of the refrigerant suction port. That is, in the environmental test apparatus of this aspect, the temperature measurement portion is attached at a position far from the refrigerant suction port. Therefore, according to this aspect, the temperature measurement portion is less likely to be affected by cold heat of a refrigerant introduced from the refrigerant suction port. Therefore, the temperature measurement portion can detect a temperature of a compressor more accurately.

In the aspect described above, it is preferable that a refrigeration circuit have a second bypass flow path connecting the discharge side of the condenser and the suction side of the compressor, and the second bypass flow path be provided with a second flow rate control portion of which a substantial degree of opening is to change according to a temperature of a refrigerant introduced into the compressor.

The environmental test apparatus of this aspect has a second bypass flow path, and the second bypass flow path is provided with a second flow rate control portion of which a substantial degree of opening changes according to a temperature of a refrigerant introduced into a compressor. Specifically, when a high-temperature state refrigerant returns to the compressor, the second flow rate control portion is opened, or the degree of opening of the second flow rate control portion is substantially increased, and thus the refrigerant flowing through the second bypass flow path is introduced into the compressor to cool a motor or the like.

In the aspect described above, the refrigeration circuit may have a cascade cooling structure including a primary refrigeration circuit and a secondary refrigeration circuit, and in the primary refrigeration circuit, a high temperature side compressor, a high temperature side condenser, a high temperature side expansion portion, and a primary side of a cascade condenser may be sequentially connected in a ring, in which the phase-changing refrigerant may be circulated. In the secondary refrigeration circuit, a low temperature side compressor, a secondary side of the cascade condenser, a low temperature side expansion portion, and a low temperature side evaporator may be sequentially connected in a ring, in which the phase-changing refrigerant may be circulated.

The environmental test apparatus of this aspect is equipped with a refrigeration circuit having a cascade cooling structure.

In general, the environmental test apparatus equipped with the refrigeration circuit having the cascade cooling structure can create a substantially low temperature environment in a test chamber. On the other hand, a cooling portion having the cascade cooling structure may result in severe operating conditions.

The environmental test apparatus of this aspect is equipped with the refrigeration circuit having the cascade cooling structure, and can create the substantially low temperature environment in the test chamber. Further, in the environmental test apparatus of this aspect, a motor is cooled by appropriately introducing a refrigerant having a cooling capacity into a compressor, so that the motor burnout is less likely to occur.

An environmental test apparatus of the present invention has the effect of suppressing excessive heat generation or the like of a motor of a compressor, because a refrigerant having a cooling capacity is appropriately introduced into the compressor.

What is claimed is:

1. An environmental test apparatus that can create a predetermined environment inside a test chamber, the environmental test apparatus comprising:

the test chamber configured such that a test target object is placed inside the test chamber;

a heating portion configured to heat an inside of the test chamber; and a cooling portion configured to cool the inside of the test chamber, wherein the cooling portion has a refrigeration circuit in which a phase-changing refrigerant is circulated, the refrigeration circuit having a compressor, a condenser configured to receive compressed refrigerant from the compressor, an expansion portion configured to receive condensed refrigerant from the condenser, and an evaporator configured to receive expanded refrigerant from the expansion portion and to return vaporized refrigerant to the compressor, the refrigeration circuit has a first bypass flow path connecting a discharge side of the condenser and a suction side of the compressor and the first bypass flow path is provided with a first flow rate control portion, a temperature measurement portion is configured to measure a temperature of the compressor, and a controller is configured to control the inside of the test chamber to the predetermined environment and to control a degree of opening of the first flow rate control portion according to a detection value of the temperature measurement portion.

2. The environmental test apparatus according to claim 1, wherein the compressor is an enclosed compressor in which a motor and a compression portion are built in a closed container, the closed container is configured to contain a lubricating oil, and the temperature measurement portion is attached on an outer surface of the closed container at a position corresponding to an area where the lubricating oil is contained.

3. The environmental test apparatus according to claim 1, wherein the compressor is an enclosed compressor in which a motor and a compression portion are built in a closed container, the closed container is configured to contain a lubricating oil, and the compressor has a refrigerant suction port into which the refrigerant is to be introduced, and the temperature measurement portion is attached on an outer surface of the closed container in an area on a side opposite to the refrigerant suction port with respect to an imaginary plane containing a center of the closed container that is parallel to an imaginary plane containing a vertical cross section of the refrigerant suction port.

4. The environmental test apparatus according to claim 1, wherein the refrigeration circuit has a second bypass flow path connecting the discharge side of the condenser and the suction side of the compressor, and the second bypass flow path is provided with a second flow rate control portion and a temperature sensing element configured to sense a temperature of the refrigerant introduced into the compressor, and a degree of opening of the second flow rate control portion is to be controlled according to the temperature of the refrigerant introduced into the compressor which is sensed by the temperature sensing element.

5. The environmental test apparatus according to claim 1, wherein the refrigeration circuit has a cascade cooling structure including a primary refrigeration circuit and a secondary refrigeration circuit, and in the primary refrigeration circuit, a high temperature side compressor, a high temperature side condenser, a high temperature side expansion portion, and a primary side of a cascade condenser are sequentially connected in a circulation loop, in which the phase-changing refrigerant is to be circulated, and in the secondary refrigeration circuit, a low temperature side compressor, a secondary side of the cascade condenser, a low temperature side expansion portion, and a low temperature side evaporator are sequentially connected in a circulation loop, in which the phase-changing refrigerant is to be circulated.

* * * * *